(12) United States Patent
Fujino

(10) Patent No.: US 6,834,830 B2
(45) Date of Patent: Dec. 28, 2004

(54) MAIN WING STRUCTURE

(75) Inventor: Michimasa Fujino, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 130 days.

(21) Appl. No.: 10/373,963

(22) Filed: Feb. 27, 2003

(65) Prior Publication Data

US 2003/0230670 A1 Dec. 18, 2003

(30) Foreign Application Priority Data

Jun. 12, 2002 (JP) ....................... 2002-170787

(51) Int. Cl.$^7$ ............................... B64C 3/00
(52) U.S. Cl. .................... 244/35 R; 244/198
(58) Field of Search ................ 244/35 R, 198, 244/204, 218, 45 R

(56) References Cited

U.S. PATENT DOCUMENTS

| | | | | |
|---|---|---|---|---|
| 4,412,664 A | * | 11/1983 | Noonan | 244/35 R |
| 4,459,083 A | * | 7/1984 | Bingham | 416/223 R |
| 4,776,531 A | * | 10/1988 | Noonan | 244/35 R |
| 5,344,102 A | * | 9/1994 | Nakadate et al. | 244/35 R |
| 2002/0005458 A1 | * | 1/2002 | Carter et al. | 244/35 R |

FOREIGN PATENT DOCUMENTS

GB          615 284 A       1/1949

OTHER PUBLICATIONS

American Institute of Aeronautics and Astronautics, vol. 32, No. 4, Jul. 1, 1995, XP000516891, "Natural–Laminar–Flow Airfoil for General–Aviation Application," Selig et al., pp. 710–715.

* cited by examiner

*Primary Examiner*—J. Woodrow Eldred
(74) *Attorney, Agent, or Firm*—Birch, Stewart, Kolasch & Birch, LLP

(57) ABSTRACT

A main wing structure comprises at least a leading edge structure and a wing central structure coupled to each other, and has a particular laminar-flow airfoil. The laminar-flow airfoil includes an upper wing surface, a lower wing surface, a leading edge and a trailing edge. The upper wing surface includes: a front profile portion which has a positive curvature radius, and which is provided to extend from the leading edge to a largest-thickness point located at 38% of a wing chord length; a central profile portion which has a positive curvature radius, and which is provided to extend from the largest-thickness point to the vicinity of a position corresponding to approximately 90% of the wing chord length at which a value obtained by dividing a thicknesswise difference between the position and the largest-thickness point by a distance in a direction of a wing chord from the largest-thickness point is equal to or smaller than 0.12; and a rear profile portion which has a negative curvature radius, and which is provided to extend from the vicinity of a position corresponding to approximately 95% of the wing chord length to the trailing edge. Coupled portions between the leading edge structure and the wing central structure are arranged at positions corresponding to approximately 20% of the wing chord length. Thus, it is possible to minimize an increase in drag due to a gap and a step between the coupled portions between the leading edge structure and the wing central structure.

20 Claims, 7 Drawing Sheets

MAIN WING STRUCTURE

CROSS-REFERENCE TO RELATED APPLICATIONS

The present nonprovisional application claims priority under 35 USC 119 to Japanese Patent Application No. 2002-0170787 filed on Jun. 12, 2002 the entire contents thereof is hereby incorporated by reference.

BACKGROUND OF THE INVENTION

1. Field of the Invention

The present invention relates to a main wing structure having a particular laminar-flow airfoil and including at least a leading edge structure and a wing central structure coupled to each other.

2. Description of the Related Art

A boundary layer on a surface of a main wing of an airplane is a laminar-flow boundary layer at a leading edge, but changes from the laminar-flow boundary layer to a turbulent-flow boundary layer toward a trailing edge. A friction drag on the surface of the main wing is smaller at the laminar-flow boundary layer than at the turbulent-flow boundary layer. For this reason, in order to decrease the drag on the main wing, it is desirable that a transition point at which the laminar-flow boundary layer changes to the turbulent-flow boundary flow is displaced toward the trailing edge, to thereby extend the region of the laminar-flow boundary layer as much as possible.

A laminar-flow airfoil of "6-series" developed by NACA in early 1940s can suppress the drag better than the conventional laminar-flow airfoil. However, when a portion of a wing surface in the vicinity of a leading edge is rough, the largest lift disadvantageously tends to decrease largely, leading to a great problem during takeoff or landing of the airplane.

Thereafter, NASA developed NLF(1)-0215F and NLF(1)-0414F in 1977 and 1983, respectively. These laminar-flow airfoils enables a reduction in the drag, but have a problem of causing a large head-lowering pitching moment. Moreover, because these laminar-flow airfoils are for use in a low-speed range, they have a problem of causing drag-divergence phenomenon at an early stage, of a subsonic speed range.

In HSNLF (1)-0213 developed by NASA in 1984 for use in a high subsonic speed range, a drag-divergence phenomenon is difficult to generate, and a head-lowering pitching moment is small. However, the largest lift in a lower Reynolds number range is small and the capacity of an inner-wing fuel tank is insufficient because the wing thickness is about 13% of a wing chord length, leading to a difficulty in ensuring mileage.

A main wing structure of an airplane is constructed from at least a leading edge structure and a wing central structure coupled to each other. Each structure is assembled separately in advance. It is conventionally unavoidable that a small gap and a small step generated between the coupled portions cause an increase in drag. The laminar-flow airfoil is formed to provide a decrease in drag, which is one of its main objects, and hence it is desired that the increase in drag due to the small gap and the small step generated between the coupled portions is minimized.

SUMMARY AND OBJECTS OF THE INVENTION

Accordingly, it is an object of the present invention to minimize an increase in drag due to a small gap and a small step generated between coupled portions between a leading edge structure and a wing central structure, in a main wing structure having a particular laminar-flow airfoil and including at least a leading edge structure and a wing central structure coupled to each other.

To achieve the above object, according to the present invention, there is provided a main wing structure comprising at least a leading edge structure and a wing central structure coupled to each other, wherein said main wing structure has a laminar-flow airfoil comprising an upper wing surface, a lower wing surface, a leading edge and a trailing edge, said upper wing surface including: a front profile portion which has a positive curvature radius, and which is provided to extend from the leading edge to a largest-thickness point located in a range of 30% to 50% of a wing chord length; a central profile portion which has a positive curvature radius, and which is provided to extend from the largest-thickness point to the vicinity of a position corresponding to approximately 90% of the wing chord length at which a value obtained by dividing a thicknesswise difference between the position and the largest-thickness point by a distance in a direction of a wing chord from the largest-thickness point is equal to or smaller than 0.12; and a rear profile portion which has a negative curvature radius or is rectilinear, and which is provided to extend from the vicinity of a position corresponding to approximately 95% of the wing chord length to the trailing edge and wherein coupled portions between said leading edge structure and said wing central structure are arranged at positions corresponding to approximately 20% of the wing chord length.

With the above arrangement, the largest-thickness point at a rear end of the front profile portion on the upper wing surface of the laminar-flow airfoil of the main structure is established at a position which corresponds to a range of 30% to 50% of the wing chord length and which is closer to the leading edge than in the conventional laminar-flow airfoil. Therefore, the pressure gradient in the central profile portion extending from the largest-thickness point toward the trailing edge is gentler than that in the conventional laminar-flow airfoil, thereby stabilizing a turbulent-flow boundary layer and suppressing the occurrence of the undesirable turbulent-flow boundary layer separation to achieve an increase in lift and a decrease in drag. In addition, the rear profile portion which has the negative curvature radius (or which is rectilinear) is provided to extend from the position corresponding to 95% of the wing chord length on the upper wing surface to the trailing edge, thereby suddenly reducing the speed of air flow at the rear profile portion, to positively promote the turbulent-flow boundary layer separation. As a result, it is possible to decrease the lift in the vicinity of the trailing edge of the laminar-flow airfoil, to thereby decrease the head-lowering pitching moment.

In the main wing structure using the laminar-flow airfoil having the above-described characteristic, the coupled portions between the leading edge structure and the wing central structure are arranged at the positions corresponding to approximately 20% of the wing chord length. Therefore, an increase in drag due to a gap and a step between the coupled portions can be minimized, which can contribute to a reduction in fuel consumption.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The present invention will now be described by way of a preferred embodiment with reference to the accompanying drawings.

Figure 1:
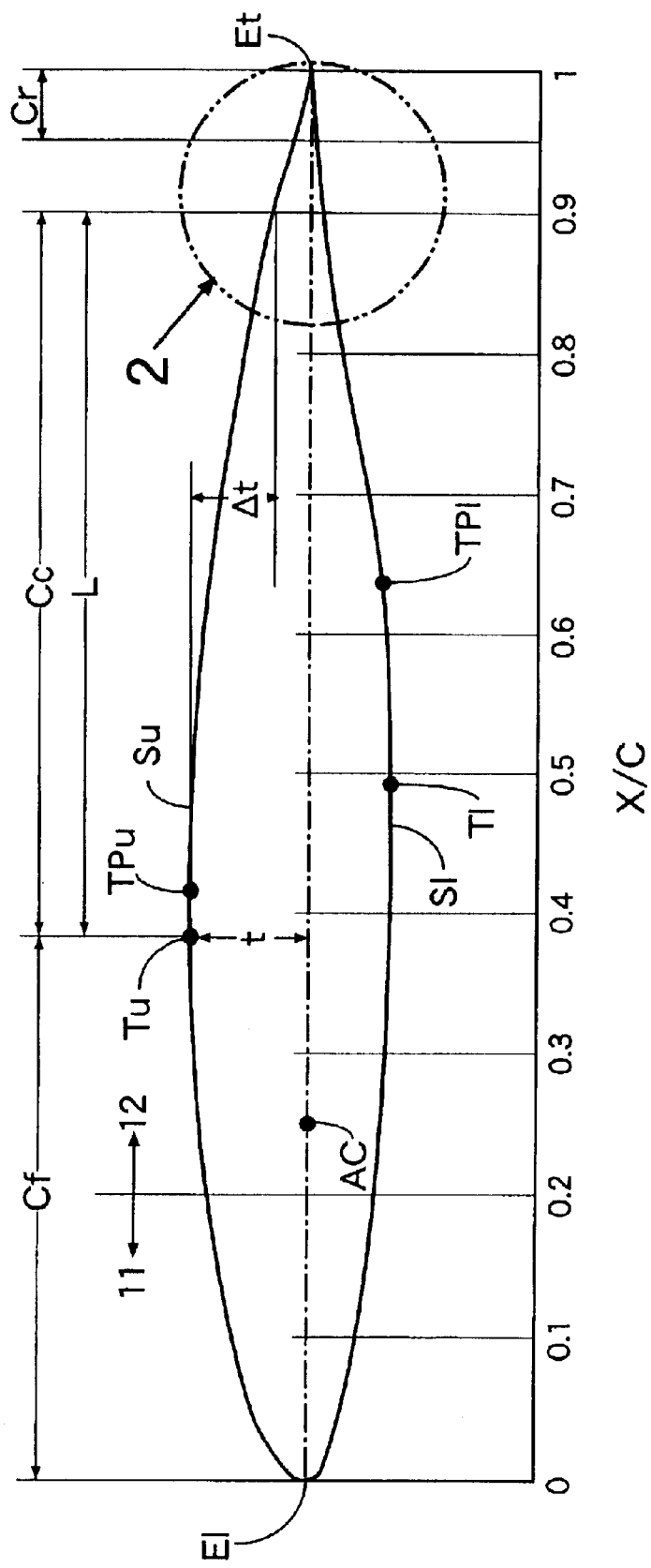
FIG. 1 is a diagram showing a laminar-flow airfoil according to the present invention.

Referring first to FIG. 1, the profile of a laminar-flow airfoil according to the present embodiment is comprised of an upper wing surface Su, a lower wing surface Sl, a leading edge El and a trailing edge Et. A largest-thickness position Tu on the upper wing surface SU measured from a cord line lies at a point corresponding to 38% of a wing chord length C in the present embodiment, to form a laminar-flow boundary layer region. A transition point TPu, at which the laminar-flow boundary layer region changes to a turbulent-flow boundary layer region, exists in the vicinity of the largest thickness position Tu. The transition point TPu lies near a position corresponding to 42% of the wing chord length C. A largest-thickness position Tl on the lower wing surface Sl measured from the cord line lies at a point corresponding to 49% of the wing chord length C in the present embodiment, to form a laminar-flow boundary layer region. A transition point TPl, at which the laminar-flow boundary layer region changes to a turbulent-flow boundary layer region, exists in the vicinity of the largest thickness position Tl. The transition point TPl lies near a position corresponding to 63% of the wing chord length C.

The reason why the positions of the transition points TPu and TPl are determined to be "near" the positions in the wing chord length C is that they change depending on flight conditions such as a Reynolds number, a Mach number and a flight attitude.

In a conventional laminar-flow airfoil, e.g., a laminar-flow airfoil of NACA "6-series," the lengths of laminar-flow boundary layer regions on an upper wing surface Su and a lower wing surface Sl are generally determined to be the same, and a position of the transition point is determined to be a point corresponding to about 50% of a wing chord length C. On the other hand, in the laminar-flow airfoil according to the present embodiment, a stalling characteristic is improved by advancing the largest-thickness position Tu on the upper wing surface Su to a position corresponding to 38% of the wing chord length C, i.e., by advancing the position of the transition point TPu associated with the largest-thickness position Tu to the vicinity of a position corresponding to 42% of the wing chord length C. Moreover, an increase in drag because of the advanced position of the transition point TPu on the upper wing surface Su is compensated for by a decrease in drag provided by retracting the largest-thickness position Tl on the lower wing surface Sl to a position corresponding to 49% of the wing chord length C, i.e., by retracting the position of the transition point TPl associated with the largest-thickness position Tl to the vicinity of a position corresponding to 63% of the wing chord length C.

A region from the leading edge El to the largest-thickness position Tu on the upper wing surface Su forms a front profile portion Cf which forms the laminar-flow boundary layer. The front profile portion Cf has a positive curvature radius, and is curved convexly outwardly.

A region from the largest-thickness position Tu to the vicinity of a point corresponding to 90% of the wing chord length C on the upper wing surface Su forms a central profile portion Cc in the present invention. In the central profile portion Cc, the turbulent-flow boundary layer changed from the laminar-flow boundary layer is developed. The central profile portion Cc has a positive curvature radius, and is curved convexly outwards. In the central profile portion Cc, however, a value (Δt/L) obtained by dividing a thicknesswise difference Δt between a front point in the central profile portion Cc (the point of 38% corresponding to the largest-thickness position Tu) and a rear point in the central profile portion Cc (the point of 90%) by a distance L in a direction of a wing chord from the largest-thickness position Tu (the position of 38% corresponding to the front point in the central profile portion Cc) to the rear point in the central profile portion Cc, is set to be equal to or smaller than 0.12. Namely, the central profile portion Cc is inclined gently from the front point toward the rear point.

Figure 3:
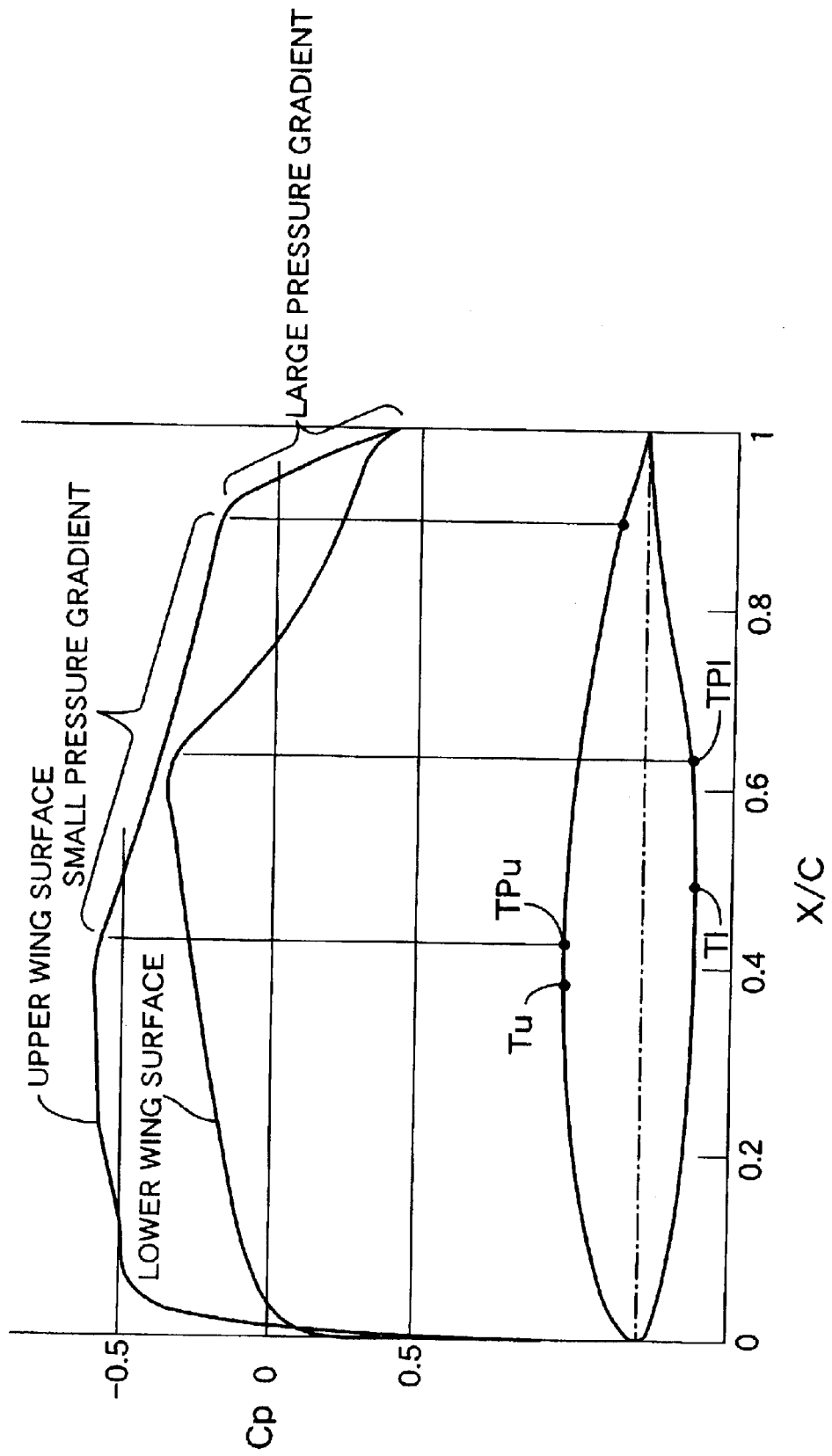
FIG. 3 is a diagram showing a theoretic design pressure profile in the laminar-flow airfoil according to the present invention.

As a result, as can be seen from FIG. 3, the pressure gradient in the central profile portion Cc of the upper wing surface Su is recovered gently from a negative pressure towards a positive pressure, so that the turbulent-flow boundary layer on such a portion can be stabilized and prevented from being separated, thereby preventing a reduction in lift and an increase in drag. If the largest-thickness position Tu is positioned more to the rear than the above-described position in the laminar-flow airfoil according to the present embodiment and as a result the pressure gradient in the central profile portion Cc becomes steep, the turbulent-flow boundary layer may be unstable and accidentally separated at any position in the central profile portion Cc, thereby causing a reduction in lift and an increase in drag. Specifically, the closer the separation point becomes to the leading edge El, more significant the reduction in lift and the increase in drag become.

Figure 2:
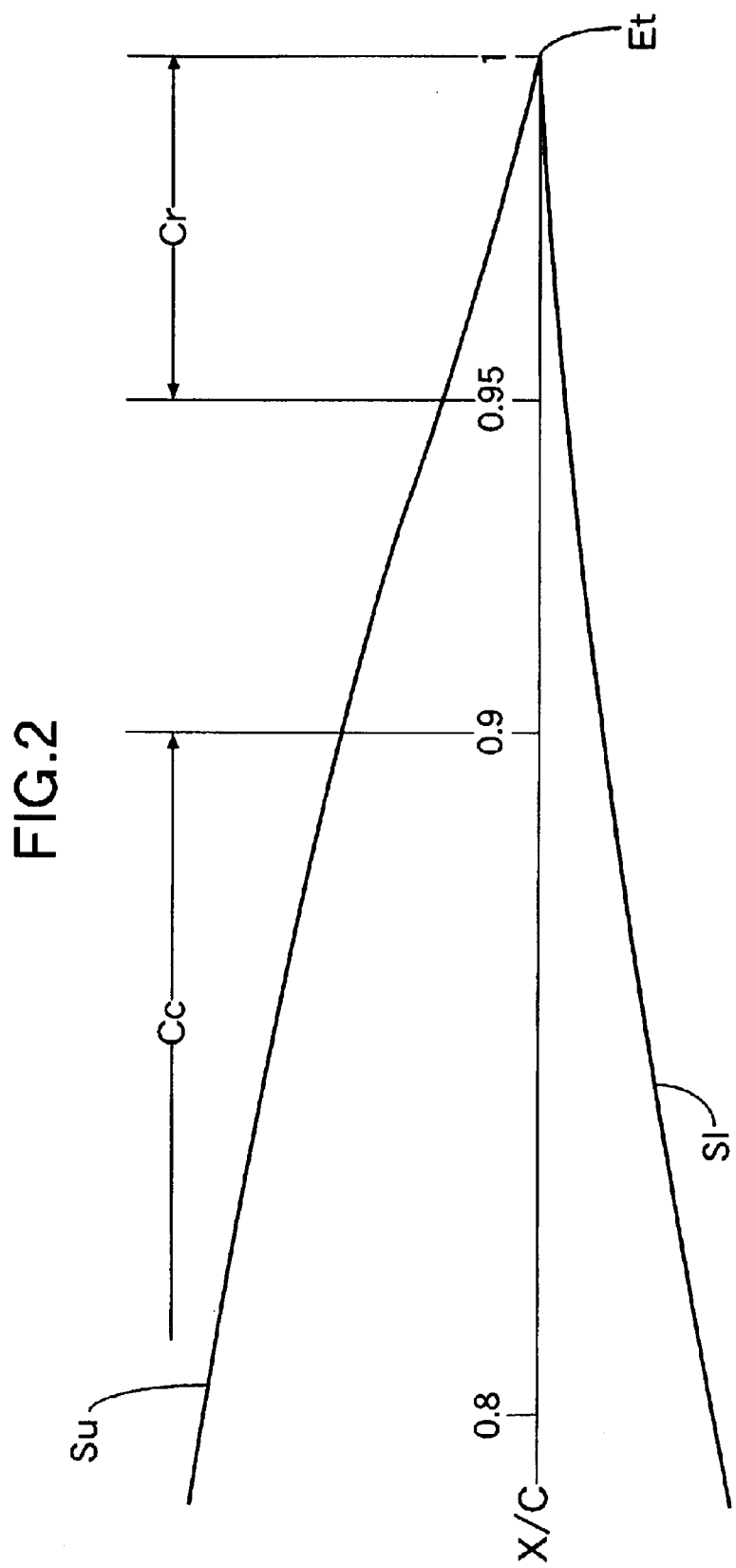
FIG. 2 is an enlarged diagram of a portion indicated by an arrow 2 in FIG. 1.

As can be seen from FIG. 2 which is an enlarged diagram of a portion in the vicinity of the trailing edge Et of the laminar-flow airfoil according to the present embodiment, a rear profile portion Cr provided in an area extending from the position corresponding to 90% of the wing chord length C to the trailing edge Et has a negative curvature radius, and is curved concavely outwards. As can be seen from FIG. 3, the speed of an air flow is reduced suddenly in the rear profile portion Cr having the negative curvature radius, whereby the pressure gradient in the portion Cr is steep to cause a sudden pressure recovery from the negative pressure to the positive pressure. Thus, the separation of the turbulent-flow boundary layer is promoted in the vicinity of the rear profile portion Cr, whereby the lift in the vicinity of the trailing edge Et is decreased, so that a head-lowing pitching moment about an aerodynamic center AC is decreased. A moment arm from the aerodynamic center AC existing at a position corresponding to 25% of the wing chord length C to the trailing edge Et is longer, and hence even if the lift in the vicinity of the trailing edge Et is decreased slightly, the head-lowing pitching moment is decreased remarkably.

When the head-lowing pitching moment is decreased in the above manner, a negative lift generated by a horizontal empennage for maintaining a balance around a pitching axis can be decreased. Thus, it is possible to prevent a decrease in the lift for the entire airplane due to the negative lift generated by the horizontal empennage, and an increase in the drag on the horizontal empennage which would otherwise increase the drag on the entire airplane. Further, it is possible to eliminate the need for increasing the moment arm from a gravity center position to the horizontal empennage, thereby avoiding an increase in weight and an increase in drag. Moreover, the separation occurring at the rear profile portion Cr is slight, so that a decrease in lift and an increase in drag due to the separation do not matter.

Figure 4:
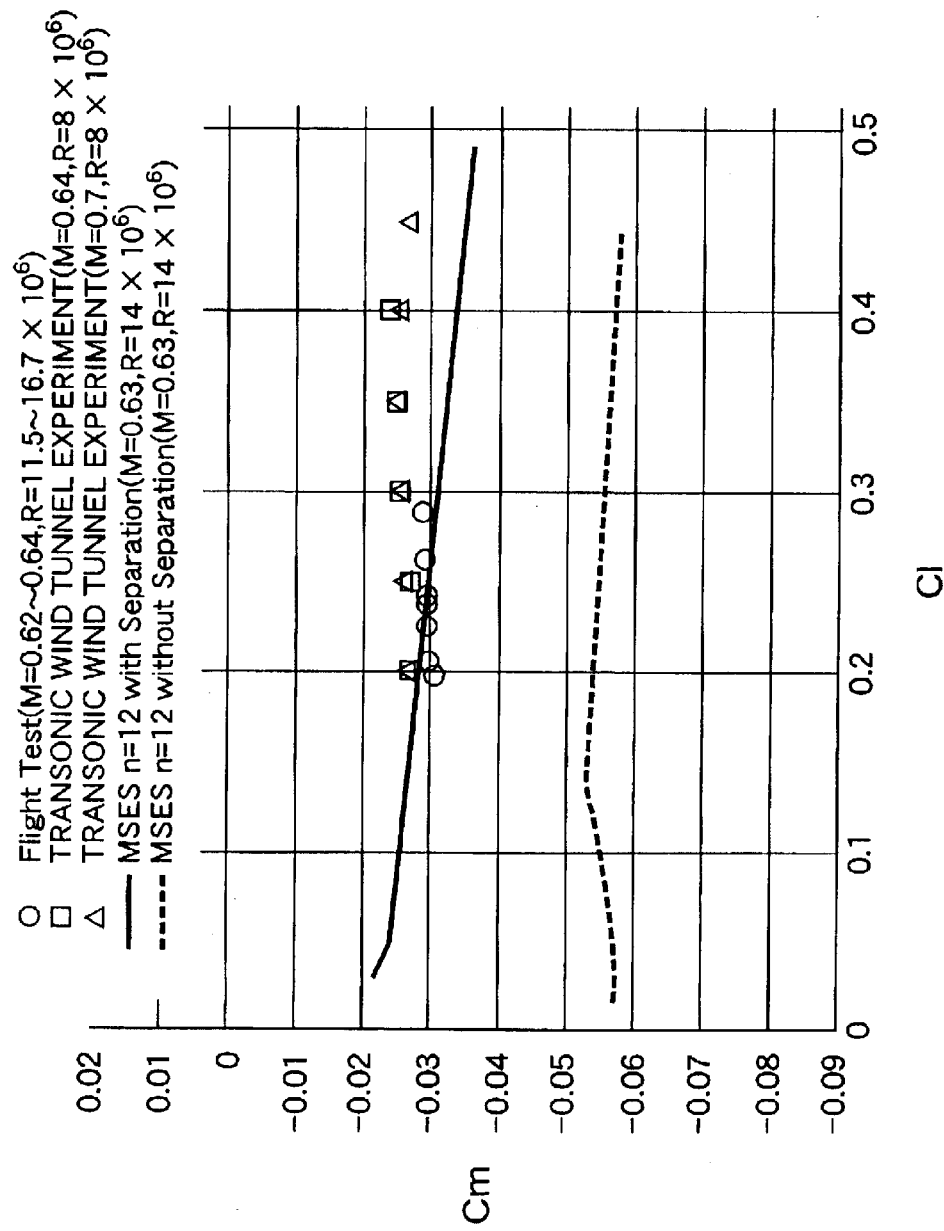
FIG. 4 is a graph showing experimental values and theoretic values for a characteristic of the pitching moment coefficient Cm relative to a lift coefficient Cl.

FIG. 4 is a diagram for explaining an effect of decreasing the head-lowering pitching moment. In FIG. 4, the circle indicates a value provided in an experiment using an actual plane (under conditions of a Mach number in a range of 0.62 to 0.64 and a Reynolds number in a range of 11.5 to $16.7 \times 10^6$); the square indicates a value provided in an experiment using a transonic wind tunnel (under conditions of a Mach number of 0.64 and a Reynolds number of $8 \times 10^6$); and the triangle indicates a value in an experiment using the same transonic wind tunnel (under conditions of a Mach number of 0.7 and a Reynolds number of $8 \times 10^6$). The solid line and the broken line each indicate a theoretical value provided by a technique (which will be referred hereinafter to as MSES) which comprises a combination of an Euler method and an $e^n$ method and which is one of analysis techniques for the airfoil in a high-speed range with a shock wave and a drag divergence taken into consideration. The solid line corresponds to a case where the separation of the turbulent-flow boundary layer in the vicinity of the rear profile portion Cr is taken into consideration. The broken line corresponds to a case where the separation of the turbulent-flow boundary layer in the vicinity of the rear profile portion Cr is not taken into consideration.

As apparent from FIG. 4, it is understood that the results of the flight experiment and the wind tunnel experiment coincide sufficiently with the theoretic value in the MSES in which the separation of the turbulent-flow boundary layer is taken into consideration, and that the head-lowering pitching moment is remarkably decreased, as compared with the theoretic value in the MSES in which the separation of the turbulent-flow boundary layer is not taken into consideration.

The largest thickness of the laminar-flow airfoil according to the present embodiment (the thickness of the wing between the upper wing surface Su and the lower wing surface S1) is 15% of the wing chord length C, and hence the capacity of a fuel tank within the wing can be increased sufficiently to ensure a required mileage.

Figure 5:
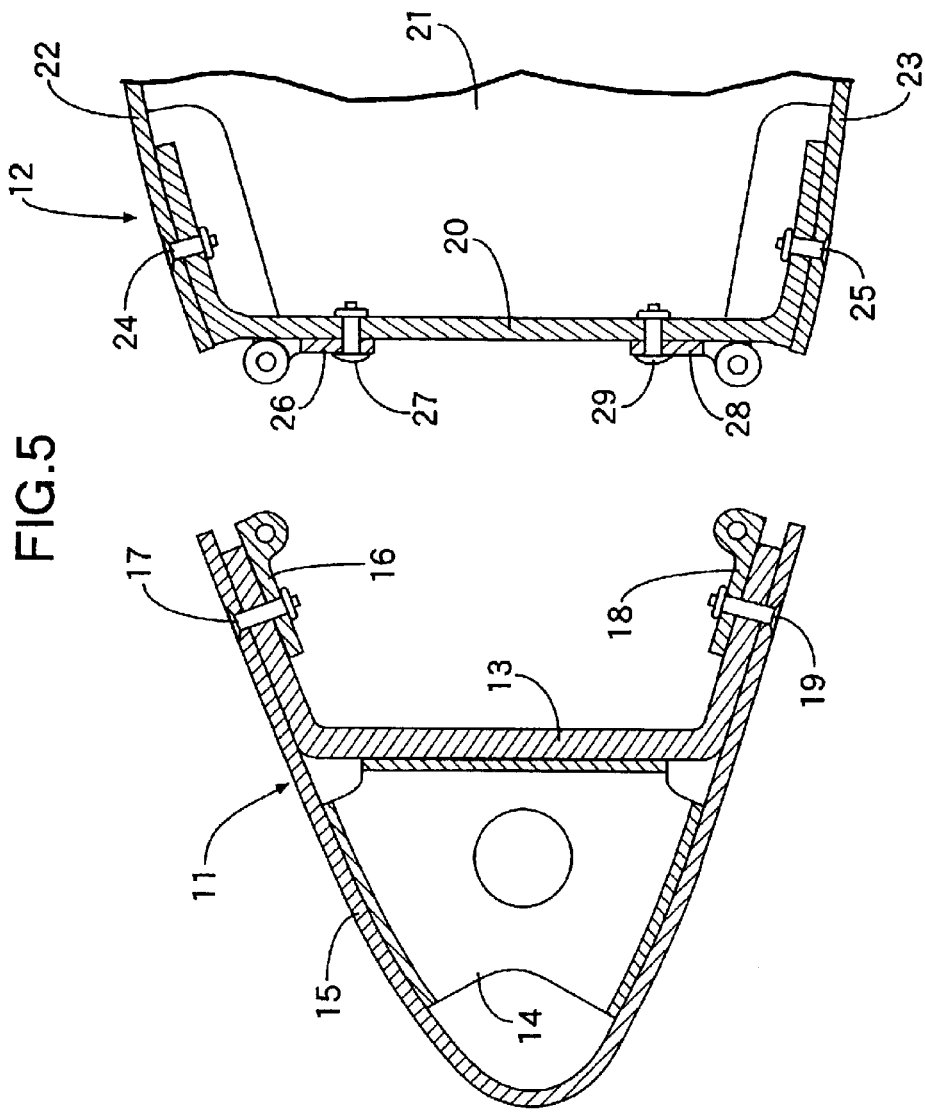
FIG. 5 is an exploded sectional view of coupled portions of a leading edge structure and a wing central structure of a main wing.
Figure 6:
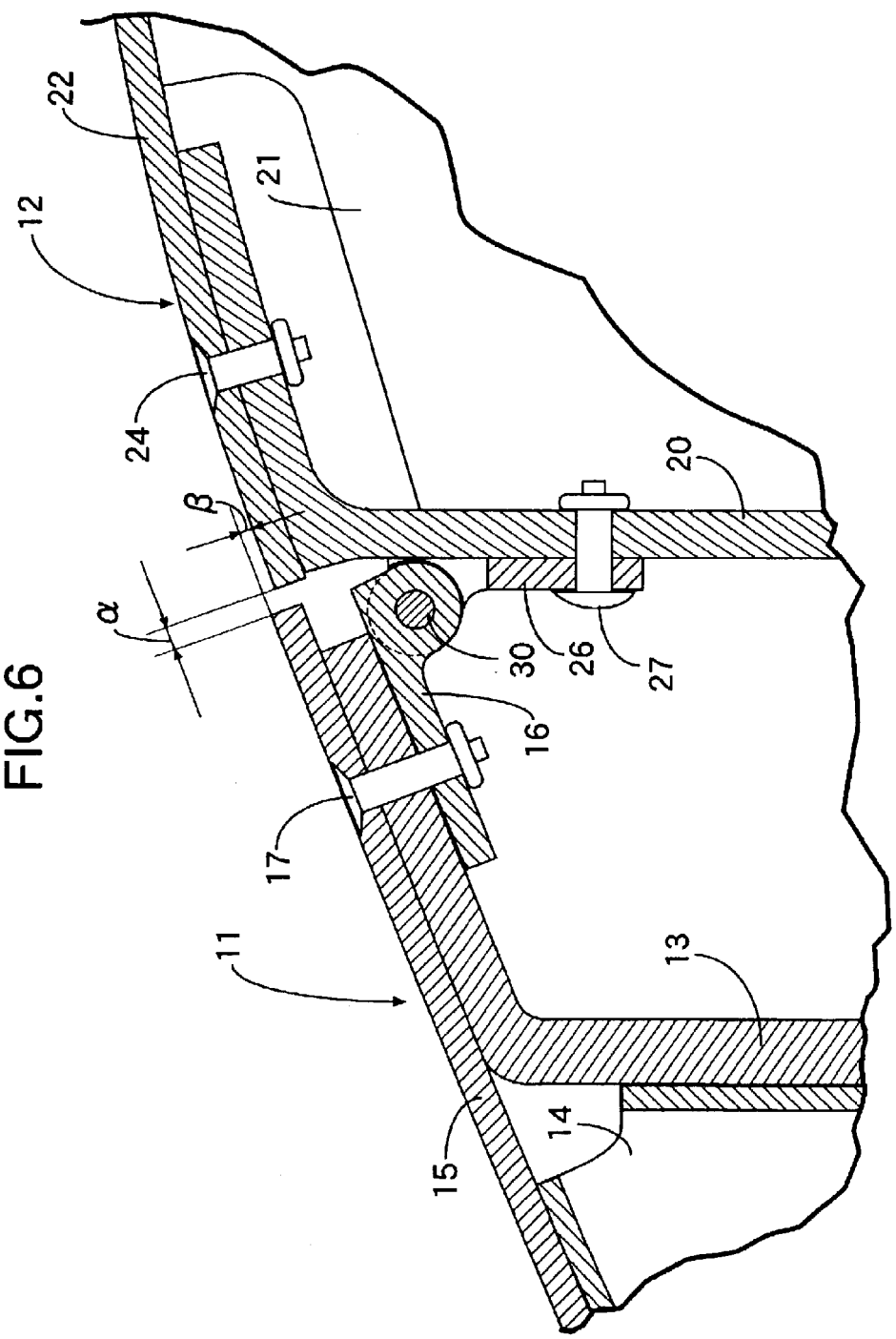
FIG. 6 is an enlarged sectional view of the coupled portions of the leading edge structure and the wing central structure of the main wing.

As shown in FIGS. 5 and 6, a main wing of an airplane employing the laminar-flow airfoil according to the present embodiment includes a leading edge structure 11 and a wing central structure 12, which are assembled separately from each other. The leading edge structure 11 includes a leading edge spar 13 having a channel-shaped section, a plurality of ribs 14 coupled to a front surface of the leading edge spar 13, and a skin 15 covering the leading edge spar 13 and the ribs 14. The skin 15 and piano hinges 16 are fastened together by rivets 17 to a rear upper portion of the leading edge spar 13 facing the wing central structure 12.

The skin 15 and piano hinges 18 are fastened together by rivets 19 to a rear lower portion of the leading edge spar facing the wing central structure 12.

The wing central structure 12 includes a front spar 20 having a channel-shaped section, a plurality of ribs 21 coupled to a rear surface of the front spar 20, and an upper skin 22 and a lower skin 23 covering the front spar 20 and the ribs 21. The upper skin 22 and the lower skin 23 are fastened by rivets 24 and 25 to the front spar 20. Piano hinges 26 are fastened by rivets 27 to a front upper portion of the front spar 20 facing the leading edge structure 11. Piano hinges 28 are fastened by rivets 29 to a front lower portion of the front spar 20 facing the leading edge structure 11.

A rear surface of the leading edge structure 11 is abutted against a front surface of the wing central structure 12, and pins 30 are inserted through the piano hinges 16 and 18 of the leading edge structure 11 and the corresponding piano hinges 26 and 28 of the wing central structure 12, whereby the wing central structure 12 and the leading edge structure 11 are integrally coupled to each other. At this time, it is unavoidable that a small gap a and a small step β are generated between a rear end of the skin 15 of the leading edge structure 11 and front ends of the upper skin 22 and the lower skin 23 of the wing central structure 12 due to an error in the manufacture.

Figure 7:
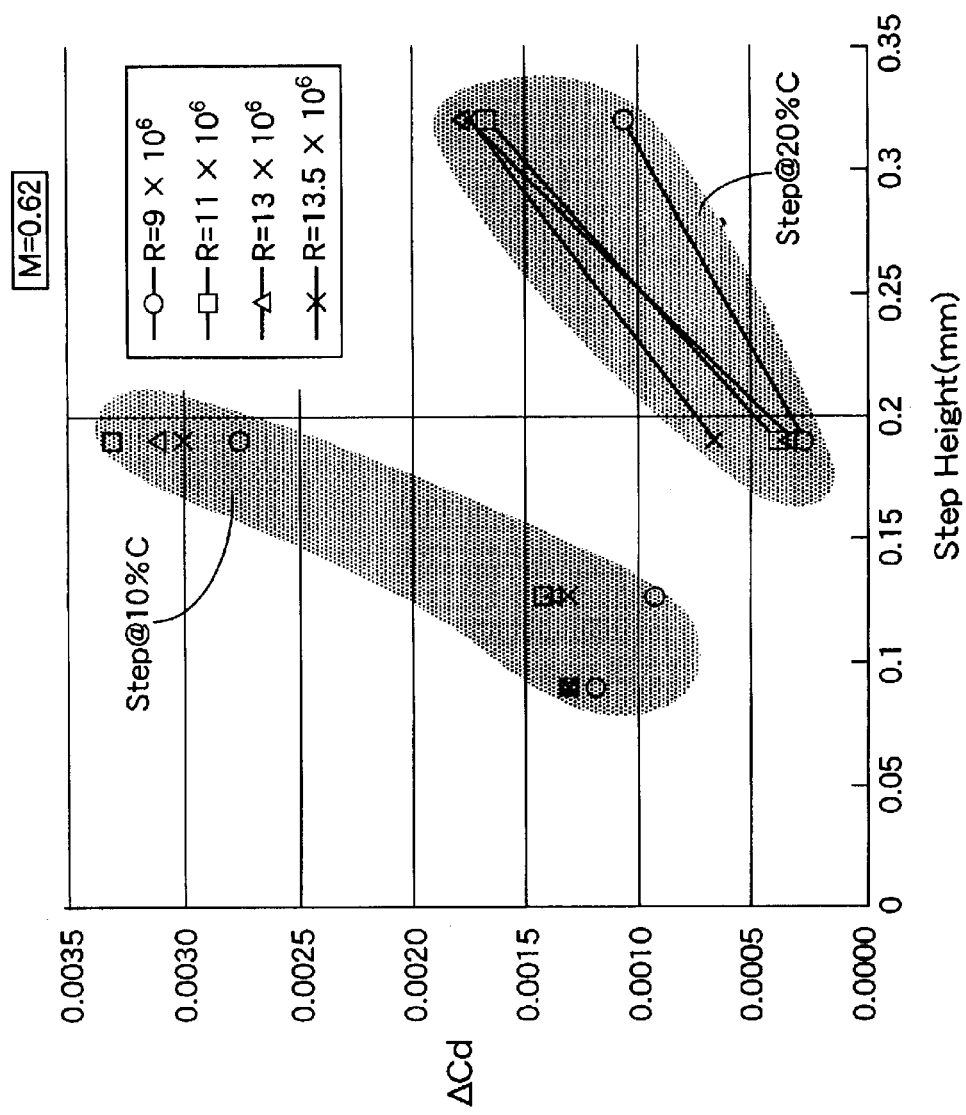
FIG. 7 is a graph showing the relationship between the sizes of steps on an upper wing surface and the amounts ΔCd of change in drag coefficient relative to those in the positions of the steps.

A graph in FIG. 7 shows the amounts ΔCd of change in drag coefficient, in the case where a step was provided in the upper surface of the laminar-flow airfoil according to the present embodiment. Specifically, a flight test was carried out using a real airplane with steps having different heights provided at positions corresponding to 10% and 20% of the wing chord length C in the upper surface of the main wing of the real airplane, wherein amounts ΔCd of change in the drag coefficient were calculated by comparison with that in a case where no step was provided. For example, when the step is 0.19 mm, it can be seen that the amount ΔCd of change in drag coefficient in the case where the step was provided at the position corresponding to 10% of the wing chord length C is about 30 counts in a range of a Reynolds number smaller than $13 \times 10^6$, while the amount ΔCd of change in drag coefficient in the case where the step was provided at the position corresponding to 20% of the wing chord length C is about 3 counts which is one tenth of the 30 counts in the range of a Reynolds number smaller than $13 \times 10^6$. That is, the influence of the step is dramatically reduced. When the Reynolds number is $13.5 \times 10^6$, the effect is somewhat reduced, but the amount ΔCd of change in drag coefficient in the case where the step was provided at the position corresponding to 20% of the wing chord length C is remarkably decreased to 7 counts from 30 counts shown in the case where the step was provided at the position corresponding to 10% of the wing chord length C.

As described above, in the case where the laminar-flow airfoil according to the present embodiment is employed, if the step is disposed at the position corresponding to 20% of the wing chord length C, an increase in drag can be minimized. Therefore, it is possible to minimize an increase in drag due to the gap a and the step β by disposing coupled portions between the leading edge structure 11 and the wing central structure 12, in which the generation of the gap a and the step β are unavoidable, at the position corresponding to 20% of the wing chord length C.

Although the embodiment of the present invention has been described in detail, it will be understood that the present invention is not limited to the above-described embodiment, and various modifications in design may be made without departing from the spirit and scope of the invention defined in the claims.

For example, the rear profile portion Cr has the negative curvature radius in the embodiment, but may be rectilinear.

In addition, the largest-thickness position Tu on the upper wing surface Su is established at the position corresponding to 38% of the wing chord length C in the embodiment, but may be established between a position corresponding to 30% of the wing chord length C and a position corresponding to 50% of the wing chord length C.

Further, even in an already existing airfoil which is not included in the present invention, a similar effect can be expected, if such an airfoil is improved into an airfoil included in the present invention by providing a padding on a surface of a wing having the airfoil or by grinding such a surface.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A main wing structure comprising at least a leading edge structure and a wing central structure coupled to each other,
   wherein said main wing structure has a laminar-flow airfoil comprising an upper wing surface, a lower wing surface, a leading edge and a trailing edge,
   said upper wing surface including:
   a front profile portion which has a positive curvature radius, and which is provided to extend from the leading edge to a largest-thickness point located in a range of 30% to 50% of a wing chord length;
   a central profile portion which has a positive curvature radius, and which is provided to extend from the largest-thickness point to the vicinity of a position corresponding to approximately 90% of the wing chord length at which a value obtained by dividing a thicknesswise difference between the position and the largest-thickness point by a distance in a direction of a wing chord from the largest-thickness point is equal to or smaller than 0.12; and
   a rear profile portion which has a negative curvature radius, and which is provided to extend from the vicinity of a position corresponding to approximately 95% of the wing chord length to the trailing edge, and
   wherein coupled portions between said leading edge structure and said wing central structure are arranged at positions corresponding to approximately 20% of the wing chord length.

2. The main wing structure according to claim 1, wherein the largest-thickness point is approximately 38% of the wing chord length.

3. The main wing structure according to claim 1, and further including a transition point at which the laminar-flow boundary layer region changes to a turbulent-flow boundary layer region.

4. The main wing structure according to claim 3, wherein the transition point is approximately 42% of the wing chord length.

5. The main wing structure according to claim 1, and further including a largest-thickness position disposed on the lower wing surface for forming a laminar-flow boundary layer region.

6. The main wing structure according to claim 5, wherein the largest-thickness position disposed on the lower wing surface is approximately 49% of the wing chord length.

7. The main wing structure according to claim 5, and further including a transition point disposed on the lower wing surface at which the laminar-flow boundary layer region changes to a turbulent-flow boundary layer regions.

8. The main wing structure according to claim 7, wherein the transition point disposed on the lower wing surface is approximately 63% of the wing chord length.

9. A main wing structure comprising at least a leading edge structure and a wing central structure coupled to each other,
   wherein said main wing structure has a laminar-flow airfoil comprising an upper wing surface, a lower wing surface, a leading edge and a trailing edge,
   said upper wing surface including:
   a front profile portion which has a positive curvature radius, and which is provided to extend from the leading edge to a largest-thickness point located in a range of 30% to 50% of a wing chord length;
   a central profile portion which is rectilinear a positive curvature radius, and which is provided to extend from the largest-thickness point to the vicinity of a position corresponding to approximately 90% of the wing chord length at which a value obtained by dividing a thicknesswise difference between the position and the largest-thickness point by a distance in a direction of a wing chord from the largest-thickness point is equal to or smaller than 0.12; and
   a rear profile portion which has a negative curvature radius, and which is provided to extend from the vicinity of a position corresponding to approximately 95% of the wing chord length to the trailing edge, and
   wherein coupled portions between said leading edge structure and said wing central structure are arranged at positions corresponding to approximately 20% of the wing chord length.

10. The main wing structure according to claim 9, wherein the largest-thickness point is approximately 38% of the wing chord length.

11. The main wing structure according to claim 9, and further including a transition point at which the laminar-flow boundary layer region changes to a turbulent-flow boundary layer region.

12. The main wing structure according to claim 11, wherein the transition point is approximately 42% of the wing chord length.

13. The main wing structure according to claim 9, and further including a largest-thickness position disposed on the lower wing surface for forming a laminar-flow boundary layer region.

14. The main wing structure according to claim 13, wherein the largest-thickness position disposed on the lower wing surface is approximately 49% of the wing chord length.

15. The main wing structure according to claim 13, and further including a transition point disposed on the lower wing surface at which the laminar-flow boundary layer region changes to a turbulent-flow boundary layer regions.

16. The main wing structure according to claim 15, wherein the transition point disposed on the lower wing surface is approximately 63% of the wing chord length.

17. A main wing structure comprising at least a leading edge structure and a wing central structure coupled to each other, wherein said main wing structure has a laminar-flow airfoil comprising an upper wing surface, a lower wing surface, a leading edge and a trailing edge, said upper wing surface including:

a front profile portion which has a positive curvature radius, and which is provided to extend from the leading edge to a largest-thickness point located in a range of 30% to 50% of a wing chord length;

a central profile portion which has a positive curvature radius, and which is provided to extend from the largest-thickness point to the vicinity of a position corresponding to approximately 90% of the wing chord length at which a value obtained by dividing a thicknesswise difference between the position and the largest-thickness point by a distance in a direction of a wing chord from the largest-thickness point is equal to or smaller than a predetermined number; and a rear profile portion which has a negative curvature radius or is rectilinear, and which is provided to extend from the vicinity of a position corresponding to approximately 95% of the wing chord length to the trailing edge, and wherein coupled portions between said leading edge structure and said wing central structure are arranged at positions corresponding to approximately 20% of the wing chord length.

18. The main wing structure according to claim 17, wherein the largest-thickness point is equal to or smaller than 0.12.

19. The main wing structure according to claim 17, wherein the central profile portion extends to the vicinity of a position corresponding to approximately 90% of the wing chord length.

20. The main wing structure according to claim 17, wherein the rear profile portion extends to a position corresponding to approximately 95% of the wing chord length.

* * * * *